Figure 1:
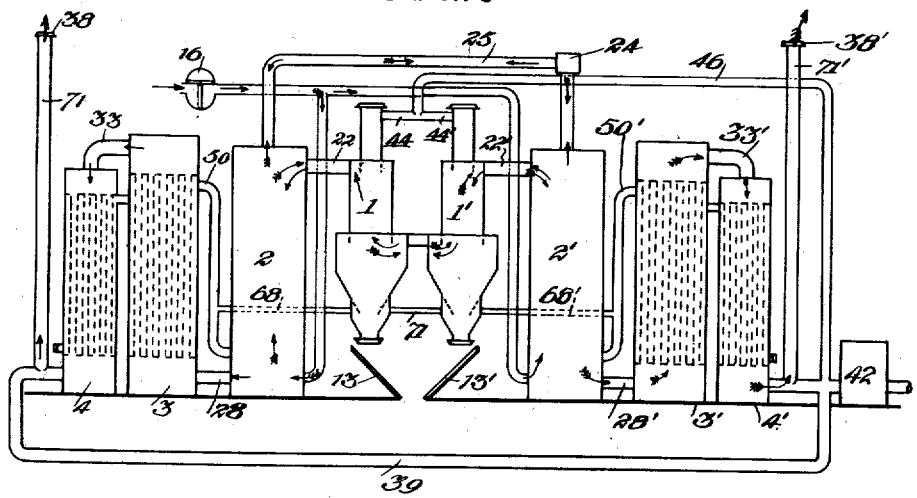

H. L. DOHERTY.
METHOD OF MANUFACTURING WATER GAS.
APPLICATION FILED JAN. 9, 1912. RENEWED NOV. 26, 1919.

Patented Mar. 14, 1922.

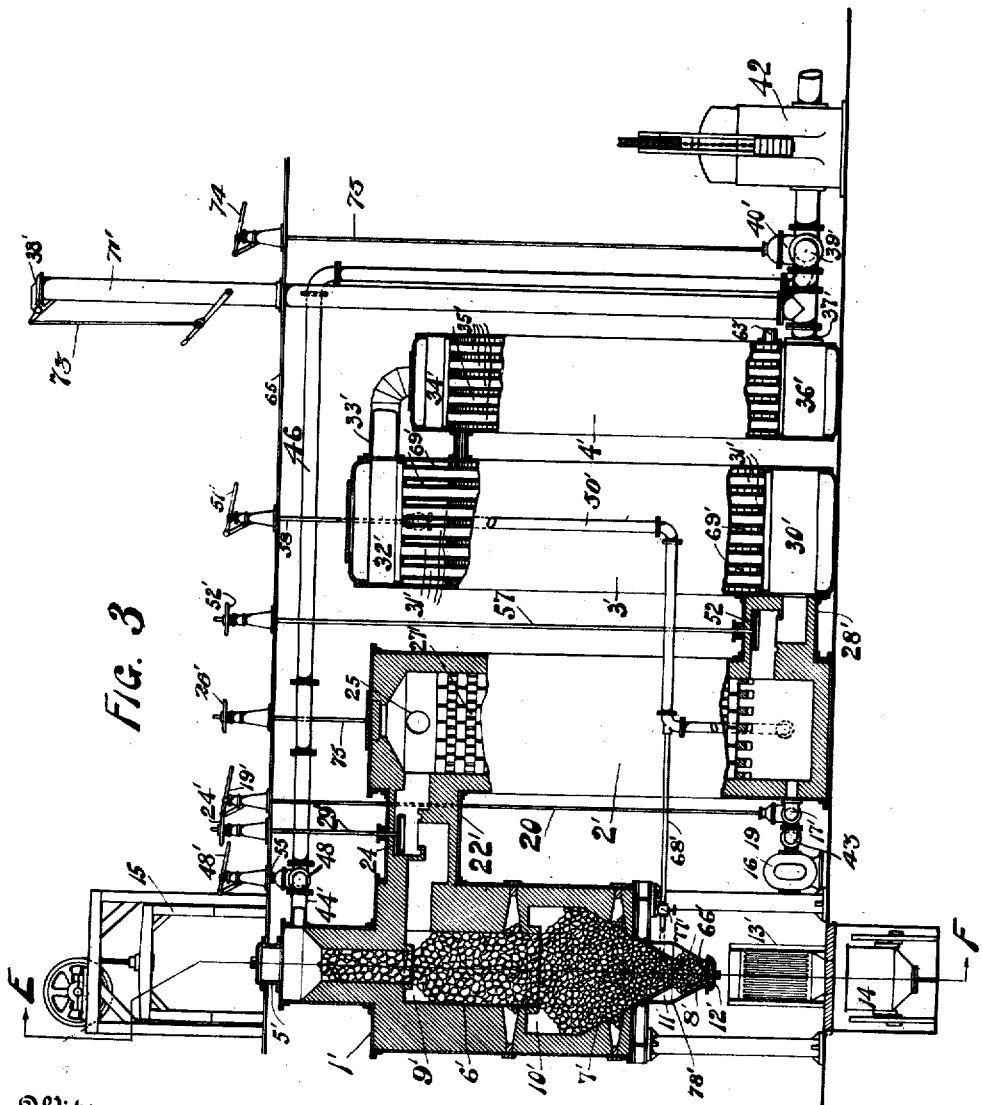

H. L. DOHERTY.
METHOD OF MANUFACTURING WATER GAS.
APPLICATION FILED JAN. 9, 1912. RENEWED NOV. 26, 1919.

1,409,682.

Patented Mar. 14, 1922.
3 SHEETS—SHEET 3.

Witnesses:
H. A. Fraetinyz
John J. McClurg

Henry L. Doherty  Inventor
By his Attorney Frank S. Young

UNITED STATES PATENT OFFICE.

HENRY L. DOHERTY, OF NEW YORK, N. Y.

METHOD OF MANUFACTURING WATER GAS.

1,409,682.  Specification of Letters Patent. Patented Mar. 14, 1922.

Application filed January 9, 1912, Serial No. 670,338. Renewed November 26, 1919. Serial No. 340,797.

*To all whom it may concern:*

Be it known that I, HENRY L. DOHERTY, a citizen of the United States, and a resident of New York city, in the county of New York and State of New York, have invented certain new and useful Improvements in Methods of Manufacturing Water Gas, of which the following is a specification.

My invention refers to a method of manufacturing water gas, and, in particular, to a method which is particularly applicable to the use of bituminous fuel in the water gas generators.

The object of my invention is the furnishing of a method for carrying out the manufacture of water gas in such a way as to secure the maximum heat economy by utilizing the sensible heat of all the products of the operation in generating steam, heating feed water for the generation of the steam, in assisting in the dissociation of the steam, in carbonizing bituminous fuel to form coal gas.

In the drawings I have shown a form of apparatus embodying and suitable for carrying out my invention.

Figure 2:
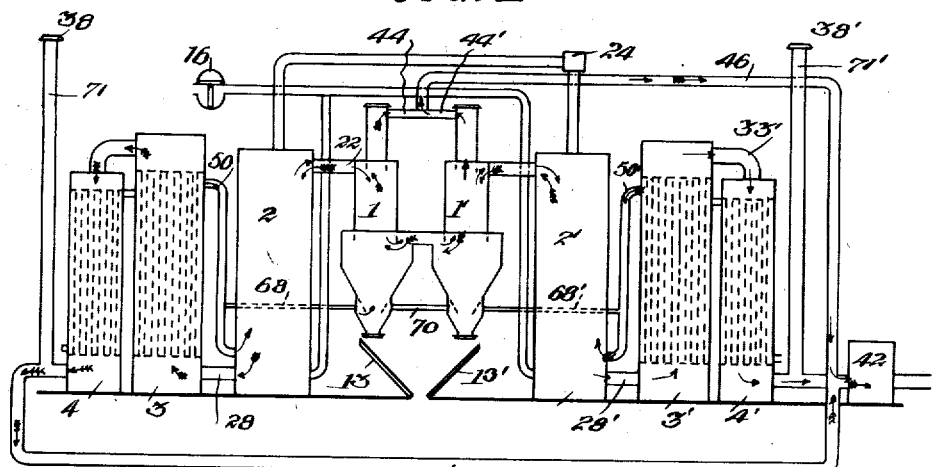
Figure 5:
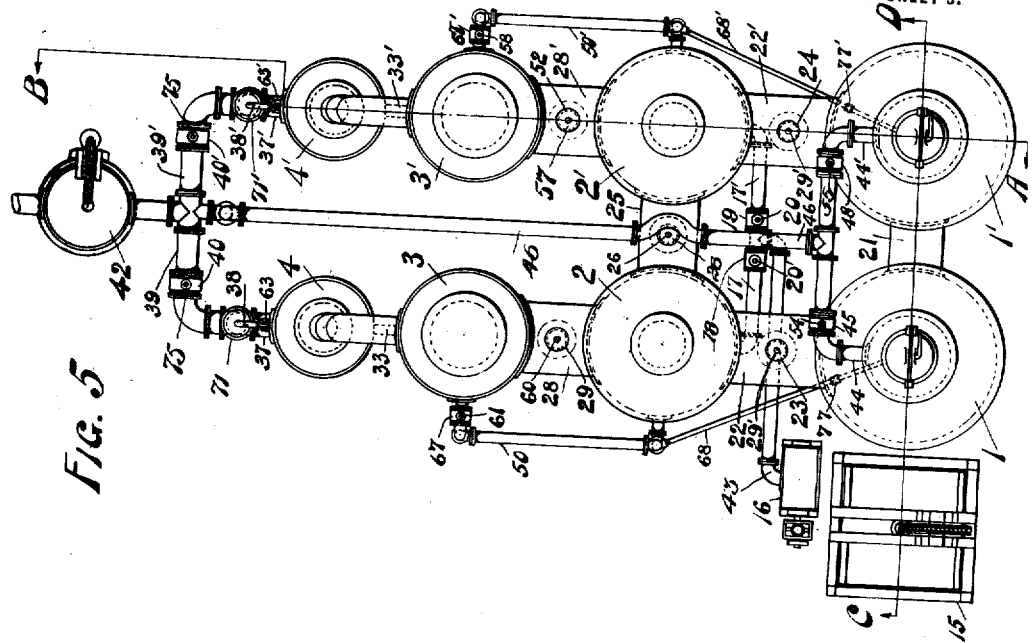
Figure 4:
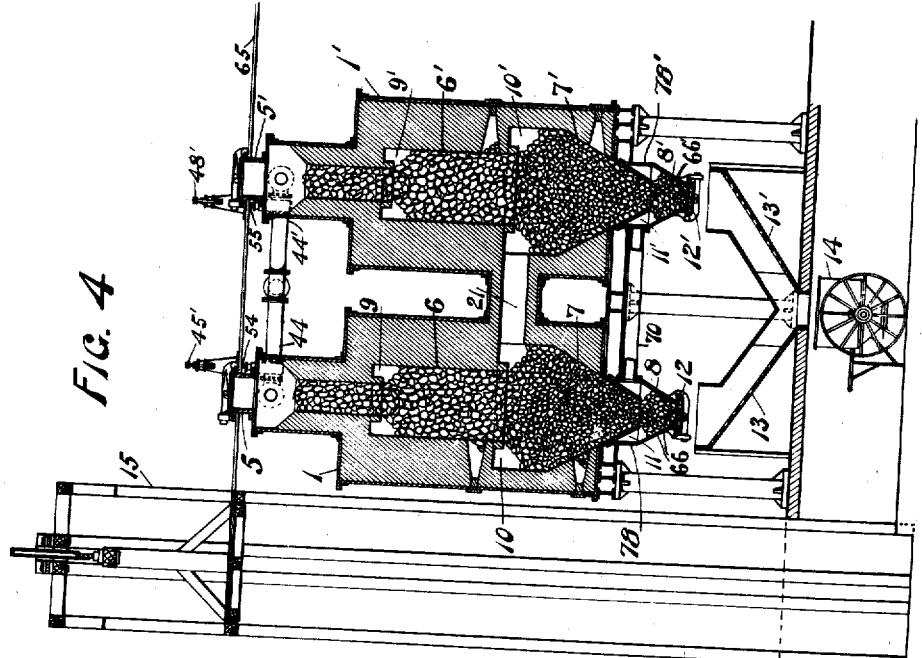

Fig. 1 is a diagrammatic elevation of a simple arrangement of apparatus for the purpose of showing the gaseous circulation during the blow, with the members of a set arranged in line for clearness of illustration. The plain arrows represent the circulation during a "blow" starting from regenerator 2'. The feathered arrows represent the circulation during a "blow" in the opposite direction, viz., starting from the regenerator 2. Fig. 2 is a similar diagram for the purpose of representing the direction of flow of the gaseous currents during the gas making operations or "runs." The plain arrows represent the "run" from regenerator 2, while the feathered arrows represent the "run" starting with regenerator 2'. Fig. 3 is a vertical longitudinal section through one-half of the apparatus on the line A—B of Fig. 5, while Fig. 4 is a vertical section at right angles to that of Fig. 3 on the lines C—D of Fig. 5 and E—F of Fig. 3. Fig. 5 is a plan view of the apparatus.

1 and 1' are the generators. 2 and 2' are, respectively, regenerators co-operating with 1 and 1'. 3 and 3' are steam boilers in which is generated the steam required in the operation of the plant, from the sensible heat of the hot gases resulting from the combustion in the regenerators of the hot gases discharging from the generators. 4 and 4' are water heaters for the respective boilers 3 and 3' in which the water is heated to near the temperature at which the steam is generated by the sensible heat remaining in the gases after the same have passed through the flues of the respective boilers 3 and 3'. Generator 1 comprises a fuel carbonizing chute, 5, a gas-making region, 6, a fuel cooling chamber, 7, and a fuel discharge hopper, 8. The corresponding parts of generator 1' are numbered 5', 6', 7' and 8', respectively. As shown in the drawings, the shafts of the generators are broadened at the bottom of the fuel carbonizing chutes 5 and 5', respectively, so as to permit the fuel to discharge into the respective chambers 6 and 6' on its natural angle of repose, whereby there is formed a free gas space, 9 and 9', respectively, surrounding the fuel cone in the upper part of the respective chambers 6 and 6'. At the bottoms of 6 and 6', respectively, the shaft is further broadened so as to permit the fuel again to establish a truncated cone on its natural angle of repose, leaving another free gas space above the fuel surface. These latter spaces in the two generators are numbered, respectively, 10 and 10'. As shown, the walls of the cooling chambers 7 and 7' converge to form a relatively narrow discharge opening, 66 and 66'. The fuel discharging through 66 and 66' falls into the fuel hoppers 8 and 8' of the respective generators, which hoppers are broader at the top than the opening 66. Therefore the residual mass discharging from 66 again forms a truncated conical surface on its natural angle of repose. A cylindrical wall, 78 and 78', respectively, surrounds the lower portion of the cooling chambers 7 and 7', respectively, of each generator, forming the steam chambers 11 and 11', respectively. Communicating with these steam chambers are branches, 68 and 68', of pipes 50 and 50', respectively, which lead from the steam spaces of the boilers 3 and 3', respectively. The steam introduced into the chambers 11 and 11' passes into the fuel cone and up through the openings 66 and 66' into the fuel mass in the coolers 7 and 7'. The bottoms of the fuel hoppers 8 and 8' are closed by doors, 12 and 12', respectively. Below the discharge doors 12 and 12' are screens or grizzlies, marked 13 and 13', respectively. The finer particles of the material passing to the screen when drawing generators pass through the screen while the over-screen portion of the material may be received in the buggy 14, or a conveyor or any equivalent device, and elevated to the charging floor, 65, from which it may be recharged into the respective fuel carbonizing chutes 5 and 5', together with the proper proportion of fresh fuel.

The valves 77 and 77' may be simple hand-operated valves and serve simply to regulate the distribution of the steam between the corresponding regenerator and the chamber 11 (or 11') of its co-operating generator. These valves once being properly set for normal working, the flow of steam is controlled by the respective main steam valves 67 and 67'. The remaining valves are preferably of a type which will permit of operation from the operating floor of the apparatus. Valves 38 and 38' are of the type customarily used on the stacks of a water gas apparatus and are operated by the chains 73. Valves 40 and 40' are operated by the levers 74 through the rods 75. Valves 67 and 67', are operated by the levers 51', through the rods 58 and 61, respectively. Valves 29 and 52 are operated by the hand-wheels 52', through the rods 60 and 57, respectively. Valves 23 and 24 are operated by the hand-wheels 24', through the rods 29' and 26, respectively. Air valves 18 and 19 are operated by the levers 19', through the rods 20 and 20', respectively. Valves 45 and 48, respectively, are operated by the levers 48', through the rods or other connections 54 and 55, respectively. The valve 26 is operated by the wheel 26' through the stem 75.

The method of operating my apparatus to carry out my invention is as follows:

Beds of ignited fuel having been built up in the respective generators according to the method well known in the art, the blower 16 is started, the valve 18 being open and valve 19 closed. Air passes through the discharge pipe 43 of the blower, thence through the connection 17 to the bottom of regenerator 2. Passing up through the checker in 2 the air divides, one stream passing through the connection 22, the valve 23 being open, into the space 9 surrounding the upper fuel cone of generator 1. Passing down through the ignited fuel mass in chamber 6 the gas passes through the fuel into the space 10 surrounding the intermediate fuel cone, thence passes through the connection 21 into the space 10' of generator 1', thence through the fuel in chamber 6' into the space 9' surrounding the upper fuel cone in this generator, thence through the connection 22' to the upper part of regenerator 2'. In its passage through the fuel masses occupying chambers 6 and 6' of the respective generators the oxygen of the blast is converted in part into carbon monoxide, invariably accompanied by a relatively small proportion of carbon dioxide. The other sub-division of the air stream passes through the connection 25 in amount controlled by valve 26, thence into the upper part of regenerator 2'. As the gas enters 2' through 22' it is ignited in any suitable manner and is burned by the air entering through 25. Under normal operating conditions, chambers 2 and 2' are always at a high enough temperature to ignite the gas immediately upon its issuing from conduit 22', or 22 as the case may be, thus preventing the formation of an explosive mixture in 2'. The products of the combustion pass down through the checker 27' of regenerator 2', highly heating the same, thence through the connection 28' into the space 30' below the lower tube sheet of boiler 3'. Passing up through the fire tubes 31' of boiler 3' the gases emerge into the space 32' above the upper tube sheet, passing thence through the connection 33' into the space 34' above the flues of economizer 4'. Passing down through the flues 35' of economizer 4' the gases emerge into the flues 36' below the lower tube sheet of the economizer, thence flow through the flue 37' and out through the stack 71', valve 38' being open and valve 40 on the connection 39 closed. When the generators have been blown in this direction for the proper length of time the blast is reversed, valve 19 being open and valve 18 being closed, the air passing through the passage 17' into and through the highly heated checker 27' in regenerator 2'. From 2' one portion of the heated air passes through 22' in the reverse direction to the former blow into the space 9' of generator 1'. Passing down through the ignited fuel in chamber 6' generator 1' the gas emerges into the gas space 10' surrounding the intermediate fuel cone of generator 1'. From 10' the draft current passes through the connection 21 into the gas space 10 surrounding the intermediate fuel cone of generator 1. Passing up through the ignited fuel occupying the chamber 6 the gas emerges into the space 9 around the upper fuel cone of generator 1, thence through the connection 22 into the upper part of regenerator 2. The other sub-division of the heated air passes through the flue 25 (valve 26 being partially open as before) into the upper part of regenerator 2. As the gas enters 2 it is ignited, as before, and is burned by the air by-passing through the flue 25. The products of combustion pass down through the checker 27' in 2, highly heating the same, thence through the connection 28, the valve 29 being open, into the space 30' below the lower tube sheet of boiler 3. Passing up through the fire tubes 31′ of boiler 3 the gases emerge into the space 32′ above the upper tube sheet of 3, thence pass through the connection 33 to the space 34′ above the upper tube sheet of economizer 4. Passing down through the flues of economizer 4 the gases enter the space 36′ below the lower tube sheet of the economizer, thence pass through the waste gas flue 37 and stack 71, the valve 38 being open.

The apparatus is now in shape to start the manufacture of the water gas. Valves 38, 38′, 18, 19, 29, 40, and 26 are closed and the valve 67 on steam connection 50 is opened. Steam now flows from the intertubular space 69′ of boiler 3 through the pipe 50 to the lower part of regenerator 2 and, in smaller portion, through the branch 68 into the steam space 11 of generator 1. A portion of this subdivision of the steam passes through the cross-connection 70 from 11 into 11′. From 11 and 11′ this sub-division of the steam passes up through the openings 66 and 66′, respectively, and thence through the fuel in the cooling chambers 7 and 7′ of the respective generators, cooling the fuel and being converted in whole or part into water gas in contact with the hot fuel in the upper portions of the respective cooling chambers and the fuel beds in chambers 6 and 6′ and joins the main draft current passing through 6 and 6′, respectively. The main portion of the steam passes up through the highly heated checker-work 27′ of regenerator 2, thence through the cross-connection 22 into the gas space 9 above the upper fuel cone in chamber 6 of generator 1. Passing down through the highly heated fuel in chamber 6 the steam reacts with the carbon of the fuel, forming hydrogen and carbon monoxide and also some carbon dioxide after the well known water gas reaction.

In the operation of my apparatus I pass the steam through the fuel in 6 at such a rate that a portion only of the same reacts with the carbon of the fuel. The resulting gaseous mixture, which consists of undecomposed steam, carbon monoxide, hydrogen and carbon dioxide, emerges into the gas space 10 around the intermediate fuel cone of generator 1, thence passes through the cross-connection 21 into the chamber 10′ around the intermediate fuel cone of generator 1′. Passing up through the highly heated fuel in chamber 6′ most of the remaining undecomposed steam and carbon dioxide is reduced to carbon monoxide and hydrogen by reaction with the highly heated fuel in chamber 6′. From the fuel mass in chamber 6′ the water gas is discharged in two streams. The larger of these streams passes through the connection 22′ into the regenerator 2′, thence down through the checker-work 27′ in 2′, through the connection 28′ into the space 30′ of boiler 3, thence through the tubes 31′ of boiler 3′ into the space 32′, flowing from 32′ through the connection 33′, space 34′, tubes 35′, space 36′ and passages 37′ and 39′ (valve 40′ being open) to the tar scrubber 42, thence to a relief holder not shown. The minor sub-division of the water gas passes up through the fuel carbonizing chute 5′ of generator 1′ in contact with the relatively cold fuel which occupies this chamber. The gases leaving the fuel bed 6′ at quite a high temperature, carbonize the fuel in the lower part of 5′ and preheat the fuel in the upper part of 5′, being themselves at the same time cooled and enriched by the gaseous products of carbonization finally discharging through the comparatively cold fuel in the upper part of 5′ through the passage 44′, the valve 48 being open while the valve 54 is closed. From 44′ the gases pass through the passage 46 to a separate purifying train or to the tar-extractor 42 to be mixed with the main stream of gas, as may be desired. The valves 40 on 39 and 48 on 44′ are so adjusted that the proportion of the water gas diverted from 6′ through 5′ will be that volume of gas which will carry sufficient heat to carbonize the raw fuel in the charge occupying chamber 5′. By this device I am able to secure a pre-carbonization of the raw fuel which constitutes a portion of the charge before the fuel has reached the gasifying chamber 6′. The distillation gases from the bituminous fuel in the mixture are therefore concentrated in the smaller sub-division of the water gas, thus enabling me to produce a fairly good illuminating gas in addition to the normal make of blue water gas. By properly regulating the volume of gas withdrawn from 5′, the gas which is drawn off through 44′ will be comparatively cool. The sensible heat of the main stream of gases which passes through the flues of boiler 3′ and economizer 4 is also recuperated, heating water and generating steam.

The direction of the run is now reversed, valves 67, 48 and 52 and 40′ being closed and valves 67′, 45, 29 and 40 opened. The larger portion of the steam from 3′ now passes through the pipe 50′ into the lower part of regenerator 2′, which has been heated by the hot gas taken off during the previous run. A sub-division of the steam flowing through 50′ passes through the branch 68′, into the steam space 11′ of generator 1′. From 11′ a portion of this steam passes through the cross-connection 70 into the steam space 11 of generator 1. The function of this sub-division of the steam is, as before, to cool the fuel occupying the cooling chambers 7 and 7′ of the respective generators. The division of the steam current is regulated by means of the valve 77′. Similarly on the first run the proper distribution of steam may be secured by manipulating valves 77. The main stream of steam passes up through the highly heated checker 27' in regenerator 2', thence through the passage 22' into the gas space 9' around the upper fuel cone in chamber 6'. Passing down through the incandescent fuel in 6' the steam is partially dissociated into carbon monoxide, hydrogen and carbon dioxide, as before, the resulting gases emerging into the steam space 10' around the intermediate lower fuel cone of generator 1'. Passing from 10' through the cross-connection 21 the mixture of undecomposed steam, hydrogen, carbon monoxide and carbon dioxide enters the gas space 10 around the intermediate fuel cone of generator 1, passes thence up through the incandescent mass of fuel in chamber 6, where the remaining steam and the carbon dioxide are for the most part reduced by reaction with the carbon of the fuel. The gas collecting in the gas space 9 will consist principally of hydrogen and carbon monoxide with small proportions of undissociated steam and carbon dioxide. The combined gaseous current passes through the connection 22, thence down through the checker 27 in regenerator 2, through the connection 28 into the space 30' of boiler 3, thence through the tubes 31' of boiler 3 into space 32' above the upper tube sheet of 3. Discharging from 32' the gases flow through the connection 33 and into the space 34' above the upper tube sheet of economizer 4, thence down through the tubes 35' of economizer 4, into the space 36' below the lower tube sheet of 4, finally discharging through the flues 37 and 39, valve 40 being open, and flow through the tar scrubber 42 to a holder or to a place of use, as before. During this reverse run the valve 48 is closed and the valve 45 opened. A portion of the water gas is diverted from the fuel bed in 6 into and through the carbonizing chute 5 of generator 1. The sensible heat of this sub-division of the water gas is utilized, as before explained, to carbonize and preheat the fuel mixture occupying chamber 5. The comparatively cool gas, mixed with distillation gases of the raw coal, passes through the passages 46 to a separate purifying train or to the tar-extractor 42, as desired.

In order to maintain the fuel mass occupying the shafts of the respective generators 1 and 1' in a condition which will permit of the ready passage of the draft current passing through the generators, I draw the fuel through the two generators at a rate greater than the rate at which it is consumed therein. After separating out the ash from the withdrawn fuel by means of the screens 13 and 13', respectively, I elevate the coke by means of the buggy 14 and hoist 15, or any equivalent device, to the operating floor 65 and recharge it, together with the proper proportion of raw fuel, into the carbonizing chutes 5 and 5' of the respective generators 1 and 1'.

The rate at which the fuel is passed through the apparatus will depend to a large extent upon the amount of coke which I desire to obtain and return to maintain the porosity of the charge. I may of course, if desired, discard a portion of the coke made in each passage through the machine and return but a fraction of the coke coming out. But ordinarily I return all, or most of the coke, and run the fuel feed at such a rate that the amount of coke discharged will be about that which I desire to return. Fine coke may, if desired, be discarded. The proportion of returned coke which is desirable in the charge of the generators will depend to a great extent upon the physical character and the composition of the particular raw material which I am using. Coke from other sources may be employed, but I prefer to work in the manner described, obtaining the coke from the apparatus itself.

With a highly caking coal, such as ordinary gas coal, I usually mix the two portions of the charge in about equal proportions. The presence of the coke, which is usually in comparatively large fragments, prevents the consolidation of the fuel into solid masses which would otherwise be formed on heating coals of the character mentioned without admixture of a non-caking material such as the returned coke I use. Interstices are therefore maintained between the fragments of the fuel and the formation of any impervious layer is prevented. I am thus able to keep the fuel in a condition which will permit of the passage of the draft current of the generators with very little back pressure, and can therefore blast at a very high velocity, whereby I am able to distribute with a fair degree of uniformity the heat burden of the gas making operation between the two generators.

The fine ash and also the coke breeze may, and advantageously will be separated from the coke discharged prior to returning such coke.

The runs are continued until undissociated steam begins to come off from the generators in considerable amount. When this occurs the run is stopped and the generators again blasted, as previously described.

It is evident that a very considerable latitude may be permitted in fixing and regulating the duration and direction of flow of the gas currents in the heating and gas-making operations (called in the art the "blow" and "run," respectively). With properly designed apparatus, I consider it advantageous to blow for about one-half minute in each direction and then run for about two and one-half minutes in each direction. It is obvious, however, that the exact arrangement adopted may be varied to suit the conditions in any given case.

It is apparent that by careful regulation of the proportion of the water gas which is drawn through the carbonizing chutes 5 and 5' I am able to secure a gas of comparatively high illuminating value, and which may, in fact, be substituted for ordinary coal gas in most of the uses to which that gas is put. By my invention I am thus able to make both blue water gas and illuminating gas, or, by combining the two gases in the manner shown, I can make an enriched water gas, as I may prefer.

While I have shown two co-operating gas-generating chambers, with an individual regenerator, boiler and water heater for each generator, it is plain that by conducting the run upward through the fuel column I may carry out my process in a single set comprising generator, regenerator, boiler and water heater, with the appurtenant blower, tar extractor, etc., although this would necessitate blowing the fuel bed with cold air. By adding an additional regenerator, however, the process could be carried out as described with a single generator, although not as advantageously as with two or more generators in series according to the arrangement shown and described.

On the other hand, it is plain that I may use a number of generators in series, the limit being fixed by the aggregate resistance offered to the passage of the draft current by the fuel beds of the generators. When this back pressure exceeds the capacity of the blowers used it is not possible to force the draft current through the generators in sufficient volume.

While in order to secure illuminating gas by my process (without the use of special enriching means such as liquid hydrocarbons) it is necessary, of course, to use a certain proportion of bituminous fuel, still many of the novel steps of my process may be carried out with a non-bituminous fuel such as hard anthracite or coke. It is therefore to be understood that in the accompanying claims the fuel specified may be either bituminous or non-bituminous.

The advantage of making water gas from bituminous fuel, with the utilization of the bituminous matter of the fuel, will, however, be obvious to anyone skilled in the art.

Similarly, I do not confine myself to the exact method of operation described as the most advantageous one, but may follow a "blow" in one direction with a run in the same or an opposite direction, as I may deem expedient in any given case.

It is obvious that, instead of using a separate boiler and heater for each regenerator, I may carry out my process by using one large boiler and heater for a plurality of generators. Similarly, I do not limit myself to the use of any particular type of boiler and water heater in carrying out my process.

It is to be understood that I recognize the advantages that would be obtained in carrying out my process by substituting a relatively pure oxygen for air should the future progress in the art make the former economically available. Therefore the word "air" in the following claims is used in a broad enough sense to include either air, free oxygen, or any suitable gaseous fluid containing free oxygen.

I do not in this application claim broadly the method of running a producer in which fuel is transmitted therethrough at a rate greater than the rate of consumption of such fuel therein with return of unconsumed fuel for admixture with the fresh fuel, this forming part of the subject matter of my co-pending application Ser. No. 660,453, filed Nov. 15th, 1911, Patent No. 1,187,051, granted June 13, 1916.

It is not essential to my method that the three distinct sections of each of the fuel bodies should be in superimposed relationship and in the same fuel conduit. Such relationship is, however, highly advantageous since it facilitates the carrying out of my process and economizes in the operating labor required. If for any reason preferred—for example, in adapting old plants operating under the old method of making water gas, to carry out my process—the three sections of each fuel unit may be maintained in separate containers. It is simply necessary to have for what corresponds to a single fuel body, in my apparatus, three portions of fuel maintained in functional relationship in such manner that they are at the same time, respectively, subjected to carbonization, combustion and cooling.

The purpose of using a mixture of coke and raw fuel in the fresh charge is to maintain the fuel body in a condition permitting ready passage of the draft current. Were the charge made up entirely of raw coking coal, the formation of pasty aggregates during the coking operation would offer such an obstruction to the passage of the draft current as would seriously interfere with the operation of the apparatus. By the expedient of, so to speak, diluting the raw coal with preformed coke the fragments of raw coal which are in contact in any one mass are comparatively few. Therefore, when the charge has reached the coking zone, in which the temperature is sufficient to partially fuse the raw coal, the size of the coke masses formed must be necessarily small, since only those particles or fragments of the coal which are in actual contact can agglomerate. Therefore I am able notwithstanding the use of coking coal, to maintain a sufficient proportion of interstices in the fuel mass to permit a free and ready flow of the draft current.

In a similar manner, by drawing the lower portion of the fuel body at a rate materially greater than the rate at which the fuel is burned in the generators I insure the presence of a relatively large proportion of coke or carbonized fuel in the material occupying the lower portion of the fuel body so that at no time is there any considerable quantity of free ash in a single mass in the fuel bed, the carbonized fuel, as in the coking region, divides the fusible portion of the charge up into a large number of relatively small masses. It is therefore impossible for the ash to form any extensive layer of clinkers in the lower portion of the fuel body, which would obstruct the draft. Clinkers are formed simply by the agglomerating of such particles of softened ash as are in actual contact. By interposing fragments or groups of fragments of non-fusible coke between small bodies of free ash the size of the clinkers formed is limited to that resulting from the union of the ash particles in actual contact.

The proportion of coke which it is necessary to maintain in the ash region of the generator to thus maintain the fuel body in a condition permitting the free passage of the draft current, will vary with the quantity and character of the ash of the fuel. When this is easily fusible, more coke is required than when it is difficultly fusible. Also, when the proportion of ash in the fuel is high the presence of more coke is required in the ash zone to prevent clinkering than when the proportion of ash is low.

Having described my invention, what I claim is:

1. A method of making gas, comprising passing fuel in columns through two or more furnaces at such a rate that a part of the fuel leaving the furnace will be unburned, igniting fuel in the columns, blowing air through the ignited fuel in said columns in series, passing steam through said heated columns in series at a rate to partially decompose said steam in the first column and more completely decompose the steam in the following columns, and diverting a portion of gas formed by the decomposition of said steam and passing it through fresh fuel in one or more of said columns to carbonize the same.

2. A process of making water gas and enriched gas, which comprises introducing and passing through one of two fuel beds which are in functional cooperation a draft current of air, introducing into and passing through the second of said fuel beds the products of the reaction of the air with the first of said fuel beds, whereby the said fuel beds are highly heated, introducing into and passing through one of the said fuel beds a current of steam at a rate faster than the rate of reaction therein, introducing into and passing through the second of said fuel beds the products of the reaction of the said steam with the carbon of the first of said fuel beds, whereby the major portion of the steam introduced is converted by reaction with the carbon of the said fuel beds into water gas at the expense of the sensible heat previously communicated to the said fuel beds, diverting a portion of said water gas, and passing another portion of the said gas in contact with fresh fuel to carbonize the said fuel and to become enriched.

3. A method of generating water gas, which comprises moving a column of ignited fuel through each of two gas-generating chambers which are in functional cooperation at a rate greater than the rate of combustion of said fuel to maintain said fuel columns in a condition permitting ready passage of the draft current, passing a stream of air in series first in one direction and then in the reverse direction through the fuel in said gas-generating chambers, whereby the fuel in said chambers is highly heated, and passing a current of steam first in one direction and then in the reverse direction through the said highly heated fuel whereby the said steam is converted into water gas.

4. A process of making water gas, which comprises passing through each of two gas-making chambers a body of ignited fuel at a rate greater than the rate of combustion of said fuel in said chambers, blasting the fuel in the said chambers first in one direction and then in the reverse direction by a current of air, whereby the fuel in said beds is highly heated and the major part of the oxygen of said air converted into combustible gas, burning the said combustible gas by another portion of air to heat refractory material and to generate steam, and passing steam first in one direction and then in the reverse direction through the fuel in said gas-making chambers after said steam has been heated by contact with the so-heated refractory material.

5. A method of making water gas, comprising passing fuel in columns through two or more furnaces at such a rate that a part of the fuel will leave the furnace unburned, igniting the fuel of the columns, blowing air through the ignited fuel of said columns in series, first in one direction and then reversing and blowing air through the series in the opposite direction, burning the exhaust products in refractory-lined regenerators by supplying additional air to said products, passing the exhaust products from the regenerators into heat-transferring relation with water to generate steam, and passing said steam through said air-heated columns in series to generate gas.

6. A method of making water gas, comprising passing fuel in columns through two or more furnaces at such a rate that a part of the fuel will leave the furnaces unburned, recovering unconsumed fuel from said furnaces and returning said fuel to the furnaces in admixture with fresh fuel, igniting fuel in the intermediate portions only of said columns, blowing air through said columns in series, first in one direction and then blowing air through the series in the opposite direction, and passing steam through said heated fuel columns in series, first in one direction and then through the series in the opposite direction.

7. A method of generating water gas and enriched gas, which comprises passing a column of fuel through each of two gas-making chambers which are in functional cooperation, passing a current of air through the middle portion of the said fuel columns to heat the fuel in said middle portions of the said fuel columns, passing steam in contact with the so-heated fuel in the said middle portions of the said columns, whereby more or less of the said steam is converted into water gas, and withdrawing a portion of the said water gas in contact with the fuel in the upper portion of the said fuel columns to carbonize and preheat said fuel and to generate enriched gas.

8. A process of manufacturing water gas and enriched gas from bituminous fuel, which comprises passing a column of fuel through a gas-making chamber at a rate greater than the rate of combustion in said chamber, alternately blasting the fuel in the lower portion only of the said column first with air to heat the said fuel in said lower portion and then with steam to make water gas, and passing a portion of the said water gas through the fuel in the upper part of said fuel column to carbonize the bituminous fuel in said portion of said column and to produce enriched gas.

9. A method of making water gas and enriched gas from bituminous fuel, which comprises passing a column of fuel through a gas-making chamber at a rate greater than the rate of combustion of the said fuel in said chamber, separating from the material discharging from the said chamber the unconsumed fuel in said material, returning said unconsumed fuel in admixture with a fresh portion of bituminous fuel to the upper part of said fuel column, passing a current of air through the lower portion of said column to heat the same by combustion of a portion of the fuel therein, passing steam through the so-heated fuel to generate water gas, and passing a portion of the hot water gas so generated through the fuel in the upper part of said column, the volume of the said portion of water gas being that which will carry sufficient sensible heat to carbonize the bituminous fuel in the said upper portion of the said column.

10. A method of making water gas and enriched gas, which comprises passing fuel through a plurality of cooperating gas-making chambers at a rate greater than the rate of combustion of said fuel in said chambers, separating the unconsumed portion of said fuel from the material discharging from said chambers, admixing said unconsumed fuel with a portion of bituminous fuel and recharging said mixture into the upper portion of said fuel columns, blasting the lower portion of each of the fuel columns in the said plurality of gas-making chambers with a draft current which initially consists of air, the said draft current being passed serially through the said chambers, passing a current of steam through the fuel in said chambers in reverse direction to the direction of flow of said air, whereby water gas is formed at the expense of the sensible heat communicated to said fuel by the combustion of a portion of the same with the oxygen of the said air, and passing a portion of the so-formed hot water gas through the fuel mixture in the upper part of the fuel columns in the said chambers, the volume of the said portion of hot water gas being that which will supply sufficient heat to carbonize the bituminous fuel in the said upper portion of said fuel columns.

11. A method of making water gas and enriched gas, which comprises passing a column of fuel through each of several cooperating gas-making chambers at a rate greater than the rate of combustion of the said fuel in said chambers, separating the unconsumed portion of the material discharging from said chambers from the free ash in said material and returning the said unconsumed material in admixture with a fresh portion of bituminous fuel to the upper part of the said fuel columns, passing a current of air through the fuel in the lower portions of the said fuel columns to heat said fuel and to generate combustible gas, burning said combustible gas with a second portion of air to heat a body of refractory material, passing a current of steam first in contact with said heated refractory material and then through the heated fuel in the lower portions of the fuel columns in the said gas-making chambers, whereby the major portion of said steam is converted into water gas, and passing a portion of the said water gas through the fuel mixture in the upper portions of the fuel columns in said gas-making chambers, the volume of the said portion of water gas being that which will carry sufficient sensible heat to carbonize the bituminous fuel in the said upper portions of the said columns.

12. A method of making water gas, comprising passing fuel in a column through a furnace, igniting a mid portion of the fuel in the column, blowing air through said mid portion to develop a high temperature therein, passing steam through said heated portion to generate water gas, burning the exhaust products of said blasting operation in refractory heat regenerators, passing the hot water gas through said regenerators, passing the exhaust gases and water gas from said regenerators into heat-transferring relationship with water to generate steam, and utilizing said generated steam for forming water gas from said fuel column.

13. A method of making water gas, comprising passing fuel in columns through two or more furnaces at such a rate that a part of the fuel will leave the furnace unburned, igniting the fuel of the columns, blowing air through the ignited fuel of said columns in series, passing steam through said air-heated columns in series to generate water gas, burning exhaust gases of said blasting operation in heat regenerators, passing said water gas and the exhaust gases from said regenerators into heat-transferring relation with water to generate steam, superheating said steam in said regenerators, and utilizing said superheated steam in the generation of water gas.

14. A method of generating water gas, which comprises passing a column of fuel through each of a plurality of gas-generating chambers, alternately maintaining combustion in an intermediate section of the fuel columns in each of the said plurality of chambers to heat the fuel in said intermediate sections and blowing the so-heated intermediate sections of the said fuel columns with steam to generate water gas, and passing a second portion of steam in contact with the fuel in the lower sections of the said fuel columns to cool said fuel.

15. A method of generating water gas, which comprises passing a column of fuel through each of a plurality of gas-generating chambers at a rate greater than the rate of combustion in said chambers, alternately maintaining combustion in an intermediate section of the said fuel columns by blowing a current of air therethrough and generating water gas in the so-heated intermediate sections of the said fuel columns by passing a current of steam into them, passing a second portion of steam in contact with the lower portions of the said fuel columns to cool the same, withdrawing the mixture of unconsumed fuel and ash from the lower portions of the said fuel columns, separating the unconsumed fuel from the material withdrawn, and returning the said unconsumed fuel in admixture with fresh bituminous fuel to the upper portions of the said fuel columns.

16. A method of generating gas, which comprises passing a column of fuel through each of a plurality of gas-generating chambers, alternately maintaining a simultaneous exothermic combustion in an intermediate section of the fuel column in each of the said plurality of gas-generating chambers to heat the fuel in said intermediate sections and blowing the so-heated intermediate sections of the said fuel columns in series with steam to generate water gas, passing a second portion of steam in contact with the fuel in the lower sections of the said fuel columns to cool said fuel, and passing a portion of the water gas formed through the upper portions of the said fuel columns in alternation to carbonize bituminous fuel in the same.

17. A method of generating water gas, comprising passing a column of fuel through each of a plurality of gas-generating chambers, igniting the fuel in an intermediate portion of said columns, blowing air in series through said ignited portions of said columns, passing steam through fuel advancing away from said intermediate portions in alernation countercurrent to the fuel movement to cool said fuel, passing said steam through said intermediate portions to generate water gas, and passing heated water gas from said intermediate portions through fuel advancing toward said intermediate portions countercurrent to the movement of said fuel to progressively carbonize the same.

18. A method of making water gas and enriched gas, which comprises passing a column of fuel through each of a plurality of gas-making chambers, blasting in series the intermediate portions of each of said fuel columns with air to heat the said intermediate portions of the said columns and to generate combustible gas, burning said combustible gas with a second portion of air to heat a body of refractory material, passing the products of said combustion after the same have been contacted with the said refractory material through the flues of a boiler to generate steam, passing steam in contact with the so-heated refractory material, passing said steam in series through the heated intermediate section of each of the said fuel columns to generate water gas, passing a second portion of steam in contact with the lower portions of the said fuel columns in alternation to cool the fuel in the same, and passing a portion of the water gas formed in contact with the upper portion of each of the said fuel columns in alternation to carbonize the bituminous fuel in the said upper portions of the said columns to form enriched gas.

19. A method of making water gas and enriched gas, which comprises passing a column of fuel through a gas-making chamber at a rate greater than the rate of combustion of the said fuel in said chamber, passing a current of air through an intermediate portion of the fuel bed in the said chamber to heat said fuel and to generate a combustible gas, burning said combustible gas with a second portion of air to generate steam, passing said steam into contact directly with the intermediate section of the fuel column in said chamber, and passing a second portion of said steam through the fuel in the lower portion of the said column to cool said fuel and to generate a further portion of water gas.

20. A method of making water gas, comprising passing fuel in columns through two or more furnaces at such a rate that part of the fuel will leave the furnace unburned, recovering unconsumed fuel from said furnaces and returning the same in admixture with fresh fuel to the furnaces, igniting the fuel of said columns, blowing air through the ignited fuel of said columns in series first in one direction and then through the series in the opposite direction, passing exhaust air blast products from said columns into heat-transferring relation with water to generate steam, and passing a part of said steam through the heated fuel columns in series first in one direction and then through the series in the opposite direction.

21. A process of manufacturing water gas and enriched gas from bituminous fuel, which comprises passing a column of fuel through a gas-making chamber at a rate greater than the rate of combustion in said chamber, the rate of passage of said fuel being that which will insure the presence in the lower portion of the said fuel column of a sufficient proportion of carbonized fuel to maintain the said lower portion in a condition easily penetrable by the draft current passing therethrough, alternately blasting the fuel in the lower portion only of the said column first with air to heat the said fuel in said lower portion and then with steam to make water gas, and passing a portion of the said water gas through the fuel in the upper part of said fuel column to carbonize the bituminous fuel and to form enriched gas.

22. A process of making water gas, comprising simultaneously passing fuel in a column through several furnaces at a rate which will insure sufficient carbonized fuel throughout the columns to maintain a condition for the ready passage of gas therethrough, igniting fuel in an intermediate portion of said columns, blasting air through said ignited portions of the columns in series, burning exhaust blast gases from the columns in a refractory regenerator, superheating steam in said regenerator and passing it in series through said heated intermediate portions to form water gas, and directing a portion of the water gas as generated through an upper portion of the fuel columns in alternation to carbonize bituminous fuel therein.

23. A process of making water gas, comprising continuously passing fuel in a column through a furnace at a rate which will insure sufficient carbonized fuel throughout the column to maintain a condition for the ready passage of gas therethrough, igniting fuel in an intermediate portion of said column, intermittently blasting air through said portion to develop a high temperature therein, passing steam through said intermediate portion to generate water gas, passing a portion of said water gas as generated through fuel advancing toward said intermediate portion to carbonize the same, and separately collecting said water gas and said coal carbonization gas.

24. A method of making water gas, comprising continuously passing fuel downwardly in a column through a furnace at a rate which will insure sufficient carbonized fuel throughout the column to maintain a condition for the ready passage of gas therethrough, igniting an intermediate portion of said column, intermittently blasting air through said portion to develop a high temperature therein, passing steam through said portion between blasting operations to generate water gas, passing water gas as generated through the upper portion of said fuel column to carbonize the same, and passing a separate portion of steam upwardly through the lower portion of said column to carry the heat of the fuel in said lower portion to said intermediate portion.

25. A method of making water gas, comprising passing fuel in a column through a furnace, igniting a mid portion only of the fuel in the column, blasting air through said mid portion to develop a high temperature therein, burning the exhaust products of said blasting operation to furnish heat for generating steam, and passing said generated steam through said fuel column to form water gas.

26. A method of making water gas, comprising passing fuel in a column through a furnace, igniting a mid portion only of the fuel in the column, blasting air through said mid portion to develop a high temperature therein, burning the exhaust products of said blasting operation to furnish heat for generating steam and for superheating said steam, and passing said superheated steam through said fuel column to form water gas.

27. A method of making water gas, comprising passing fuel in a column through a furnace, igniting fuel in the upper portion of the column, blasting air through said portion to develop a high temperature therein, burning the exhaust products of said blasting operation to furnish heat for generating steam, superheating a part of said steam and passing it through the heated portion of said fuel column to generate water gas, and passing another part of said steam directly through fuel advancing away from said heated portion and countercurrent to the fuel movement to cool the same.

28. A method of making water gas, comprising passing fuel in a column through a furnace, igniting a mid portion of the fuel in said column, intermittently blasting air through said mid portion only in a direction longitudinally of the column to develop a high temperature in said portion, and passing steam through said mid portion to form water gas.

29. A method of making water gas, comprising passing fuel in a column through a furnace, igniting a mid portion of the fuel in said column, intermittently blasting air through said mid portion only in a direction longitudinally of the column first in one direction and then in the opposite direction to develop a high temperature in said portion, passing steam through said heated portion to form water gas, and passing gas through the fuel column in a direction countercurrent to the direction of movement of the fuel in the column.

30. A method of making water gas, comprising passing fuel in a column through a furnace, igniting a mid portion of the fuel in the column, intermittently blasting air through said mid portion only in a direction longitudinally of the column to develop a high temperature therein, and passing steam through said fuel column countercurrent to the direction of movement of the fuel therein to carbonize fresh fuel advancing toward said mid portion and to cool the fuel and ash advancing away from said mid portion.

31. A method of making water gas, comprising passing fuel in a column through a furnace at such a rate that a part of the fuel will leave the furnace unburned, igniting a portion of the fuel in said column, intermittently blasting air in said mid portion only and in a direction longitudinally of said column, passing steam through said mid portion to form water gas, and recovering the unconsumed fuel discharged from said furnace and returning it with fresh fuel to said column.

32. A method of making water gas, comprising passing fuel in a column through a furnace, igniting the fuel in the column, blasting air through said column to develop a high temperature therein, burning the exhaust products of said blasting operation in refractory heat regenerators, superheating steam in said regenerators and passing it through said heated fuel column to form water gas, passing said water gas through said regenerators to reheat the same, and passing said blasting air through said reheated regenerators to preheat the air for blasting.

33. A process of making combustible gas, comprising passing fuel in a column through a furnace, igniting the fuel in the mid portion of said column, blasting air through said mid portion to raise the temperature thereof, heating a regenerator with the exhaust combustion products from said mid portion through a regenerator, and passing water vapor through said regenerator and into said heated mid portion to produce gas.

34. A process of making combustible gas, comprising passing fuel in a column through a furnace, igniting the fuel in the mid portion of said column, blasting air through said mid portion to raise the temperature thereof, heating a regenerator with the exhaust products of combustion from said mid portion, passing water vapor through said regenerator into the said heated mid portion, and passing another portion of water vapor upwardly through the lower portion of said column into said mid portion.

35. A process of making combustible gas, comprising passing fuel in a column through a furnace, igniting the fuel in the mid portion of said column, blasting air through said mid portion to raise the temperature thereof, utilizing the hot combustion products for generating steam, passing said steam through said regenerator and into said heated mid portion, and passing gas throughout said fuel column in a direction counter-current to the advance of the fuel in the column.

36. A process of making combustible gas, comprising passing fuel in a column through a furnace, igniting the fuel in the mid portion of said column, blasting air through said mid portion to raise the temperature thereof, utilizing the hot combustion products for generating steam, passing a portion of said steam through said regenerator and into said heated mid portion, and passing another part of said steam upwardly through the lower portion of said fuel column into said heated mid portion, and passing gas from said mid portion through fuel advancing thereto.

37. A method of generating combustible gas, comprising moving a column of fuel through each of the two gas generators having cross connections for functional cooperation, blasting air through a lower portion only of the said fuel columns in alternation, maintaining fuel distilling zones above the heated blast zones, directing steam into the heated blast zones in alternation, and passing gas formed by the steam through the fuel distilling zones.

38. A method of generating combustible gas, comprising moving a column of fuel through each of two gas generators having cross connections for functional cooperation, blasting air longitudinally of the fuel column through a lower portion only of the columns in alternation, maintaining fuel distilling zones above the heated blast zones, directing steam into the blast zones in alternation, and directing the steam gases longitudinally of the blast zones and the distilling zones.

39. A method of generating combustible gas, comprising passing fuel in a column through a furnace, blowing air into a lower portion of the column to maintain combustion therein maintaining a fuel distilling zone above the blast zone, preventing the blast combustion gases from entering the distilling zone, and passing steam longitudinally of the fuel column through the blast and the distilling zones.

40. A method of generating combustible gas, comprising passing fuel in a column downwardly through a furnace, blowing air into a lower portion of the column to maintain combustion therein, maintaining a fuel distilling zone above the blast zone, preventing the blast combustion gases from entering the distilling zone, passing steam through the blast zone and upwardly through the distilling zone and utilizing the waste blast gases for preheating air and steam being passed into the fuel column.

Signed at New York city, in the county of New York and State of New York, this 8th day of Jan., A. D. 1912.

HENRY L. DOHERTY.

Witnesses:
H. A. MACKENZIE,
JOHN J. McCLURG.

Certificate of Correction.

It is hereby certified that in Letters Patent No. 1,409,682, granted March 14, 1922, upon the application of Henry L. Doherty, of New York, N. Y., for an improvement in "Methods of Manufacturing Water Gas," errors appear in the printed specification requiring correction as follows: Page 3, line 66, for the reference numeral 3 read *3'*; page 4, line 12, strike out the word "lower"; page 8, line 91, claim 17, for the misspelled word "alernation" read *alternation*; page 10, line 76, claim 33, strike out the words "through a regenerator"; and that the said Letters Patent should be read with these corrections therein that the same may conform to the record of the case in the Patent Office.

Signed and sealed this 30th day of May, A. D., 1922.

[SEAL.]

KARL FENNING,
*Acting Commissioner of Patents.*